April 24, 1945.  W. L. GERKE  2,374,280
X-RAY TIMER TESTER
Filed March 11, 1943
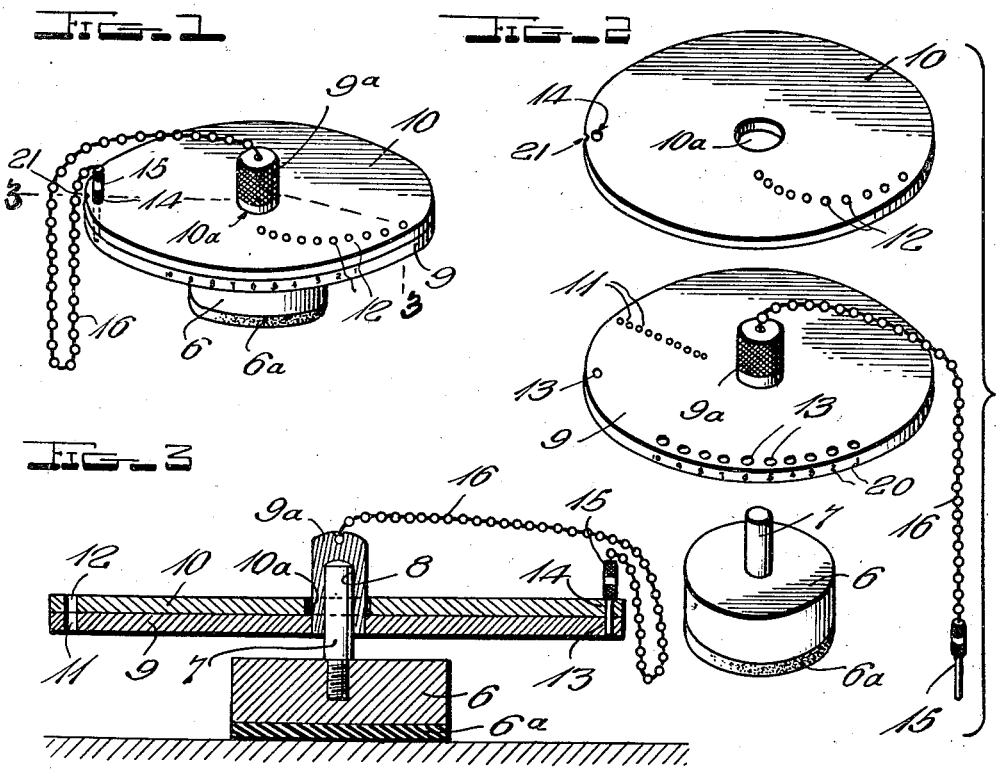
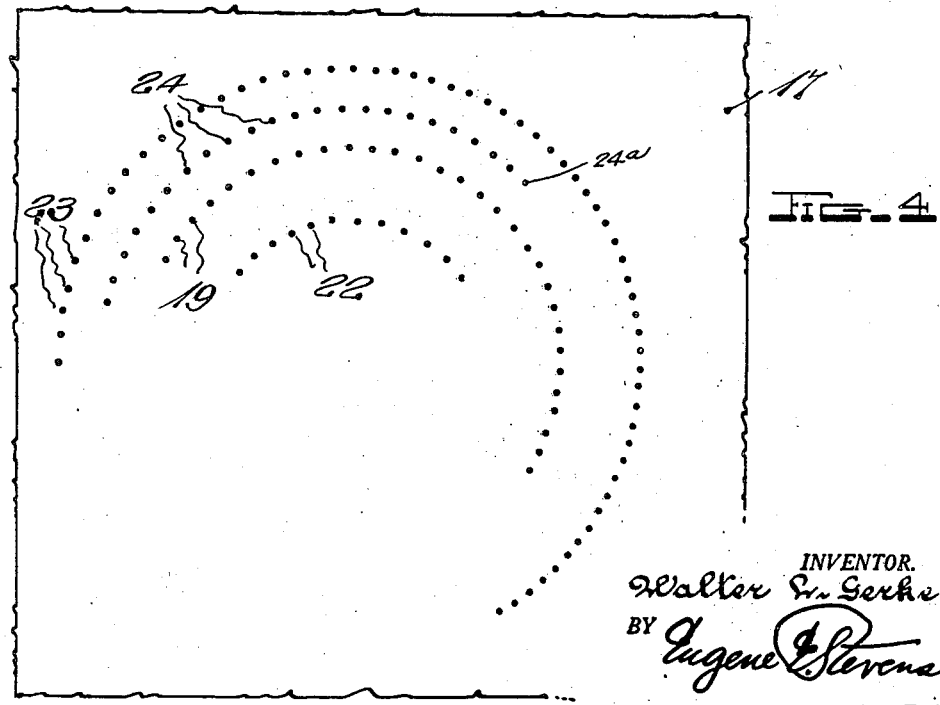
INVENTOR.
Walter L. Gerke,
BY Eugene Stevens
ATTORNEY Patented Apr. 24, 1945

2,374,280

UNITED STATES PATENT OFFICE 2,374,280

X-RAY TIMER TESTER

Walter L. Gerke, Memphis, Tenn.

Application March 11, 1943, Serial No. 478,796

11 Claims. (Cl. 250—65)

My invention relates to means for testing the accuracy of the timing devices of X-ray photographic machines or the like, so as to avoid under or over exposure of the film.

It should be understood at the outset that the various types of electric current-controlling timing devices of X-ray machines, etc., are adjustable so that X-ray discharge for predetermined lengths of time can be effected depending upon the amount of tissue, or other matter the rays must penetrate to read the film.

Experience has taught the X-ray technician just what the length of the ray discharge period should be in particular instances, using electric current of known cycle and voltage, in order to obtain satisfactory results. Since even slight over or under exposure usually produces a radiograph of poor quality, and result in misleading indications, accuracy of the timer is of paramount importance. Also, the proneness of the timer to get out of adjustment is expensive, not only in spoiled film, but often results in the burning out or damaging of costly X-ray tubes.

As is well-known, the ray discharge of an X-ray machine conforms to the pulsations of the generating current employed. This means that when 60 cycle A. C. current, subjected to "half wave" rectification, is used, sixty ray discharge pulsations will be emitted per second.

This knowledge of ray discharge frequency per second (gained through knowledge of generating current frequency) I utilize in testing the accuracy of the various timer settings. To do so, I direct the rays from the machine toward a moving apertured member disposed over a piece of X-ray film and thus record thereupon a dot for each ray pulsation discharge during a predetermined operation period. If, after being developed, the film shows a number of dots different from the known number of ray pulsations emitted during said test period, then the operator knows just what is the inaccuracy of the timer at that particular setting. It is to be understood, of course, that the movable member mentioned, supra, is impervious to X-rays; and also that instead of there being an aperture as such, said member may be pervious to X-rays at one point.

However, since the timer of the X-ray machine may be accurate at one setting and inaccurate at another, or differently inaccurate at different settings, a plurality of tests necessarily have to be made. Inasmuch as X-ray film is very expensive and the processing of same is both costly and time-consuming, it is one of the primary objects of my invention to effect the maximum of economy in film expenditure for test purposes by providing means whereby a plurality of tests may be expeditiously made upon a minor area of film.

A further, and more specific, object of the invention is to provide a device for use in conjunction with an X-ray machine for recording timer tests upon a piece of X-ray film, which device is adjustable so that accuracy of a plurality of the same or different timer settings may be made upon a minor area of film without changing the placement of the device in respect to said film.

The invention also contemplates a small device for the purpose specified which can be put away in a drawer when not in use, is easy to operate and inexpensive in manufacture, and which is highly efficient in practical use.

Other objects and advantages will become apparent to those skilled in the art upon reference to the accompanying drawing in connection with the detailed description appearing hereinafter, which deals with the now preferred form of the invention.

In the drawing, wherein the same reference characters designate the same parts throughout the several views, Figure 1 is a perspective view of a device embodying my invention;

Figure 2 is a group perspective view of the parts incorporated in the device of Figure 1;

Figure 3 is a central vertical sectional view through the device; and

Figure 4 is a fragmentary view of a developed film or radiograph showing the results of tests made thereon.

Referring to the drawing by reference characters, the device which is used in carrying out the invention comprehends a base 6 having its bottom preferably rubber-faced as indicated at 6a. The upper surface of base 6 is provided with a medial upstanding pivot post 7 which is adapted to be received in the transverse bearing 8 provided by a disk 9 and its upstanding finger piece or post 9a.

Superimposed upon the disk 9 is a second disk 10 having a central hole 10a receiving the post or finger piece 9a. The upper disk 10 is adapted for relative adjustment with respect to disk 9 about the finger piece or post 9a for a purpose to be more fully explained hereinafter. The lower or base disk 9 is provided with a radial series of apertures 11 as shown in Fig. 2 while the upper disk 10 is provided with an arcuate series of apertures 12 corresponding in number to the apertures 11 of disk 9. By relative adjustment of disk 10 with respect to the lower or base disk 9 individual ones of the arcual series of apertures 12 of disk 10 may be selectively brought into registry with different ones of the radial series of apertures 11 of disk 9 so as to provide an X-ray opening through the disks 9 and 10 at different radial distances from the medial post or finger piece 9a. The advantage of this will be discussed later.

In order to maintain the disks 9 and 10 in adjusted relationship to maintain predetermined ones of the apertures 11 and 12 in registry, I provide the bottom or base disk 9 with a marginal series of apertures 13, the number and spacement of which correspond to the number and spacement of the apertures 11, 12 of disks 9, 10, respectively. The upper disk 10 is provided with an aperture 14 adapted for selective registry with apertures 13. A pin 15 inserted into the registering apertures 13, 14 couples the disks 9, 10 against relative rotation.

Pin 15 is preferably carried by the chain or other flexible connection 16, the inner end of which is suitably anchored to the top of the post or finger piece 9a so as to guard against loss.

In carrying out the invention, the device being set with selected apertures 11, 12 in registry, is placed upon a minor area of a conventional X-ray film 17 laid on a table below the X-ray machine (not shown). The operator having set the timer for say a half second exposure, grasps the knurled post 10a and spins the coupled disks 9, 10. While they are still spinning, the machine is turned on and presumably is cut off by the timer after a one-half second exposure.

Assuming that 60 cycle A. C. electric current (subjected to half wave rectification) is used to operate the X-ray machine and that the timer is operating accurately, the developed film 17 will show an arcuate series of 30 spaced dots 19— one for each current pulsation-induced X-ray discharge during said half second exposure interval. If, on the other hand, the timer is not functioning properly the developed film 17 will show more or less than thirty dots 19 and will indicate that the timer should be adjusted.

Since the X-ray machine timer may be accurate at one exposure setting and inaccurate at another, it is desirable to carry out one or more tests, as hereinabove described, for each of the regularly used timer settings. This, as previously intimated, can be done without moving the disk-supporting base 6 from its initial position on film 17, it being only necessary to shift the top disk 10 to bring a different pair of apertures 11, 12 into registry for passage of the ray discharges.

To facilitate setting of the disks 9, 10 I preferably provide the edge of the former with numbered graduations 20 opposite its marginal apertures 13 and the disk 10 with an edge graduation or notch 21 opposite its alined aperture 14. Thus, the disk 10 can be readily shifted from one position to another and locked to disk 9 by pin 15.

In practice it is essential that the coupled disks 9, 10 make no more than one revolution during a test, as otherwise the developed film 17 may show superimposed dots 19. However, the technician after a little practice soon learns to gauge the rotation speed of the coupled disks 9, 10 so as to prevent such occurrence.

When a relatively long exposure setting of the timer is to be checked it is desirable that ray passage apertures 11, 12 remote from the axis 8, 9a be brought into registry so that the resultant relatively large number of dots 19 will be spaced and thus easily checked on the developed film.

Figure 4 shows a developed film 17 which has been employed in the making of a plurality of tests. In said Fig. 4, numeral 22 designates an arcuate series of dots produced during a ⅕ second exposure using the registering apertures 11, 12 nearest the axis 8, 9a—there being twelve dots 22 showing that the timer functioned properly and cut off the 60 cycle current after twelve current-pulsation-induced X-ray discharges had been emitted. Similarly, numerals 23 and 24 show series of dots on film 17 produced by tests of the one second and ⅜ second setting of the X-ray machine timer, respectively.

As indicated, the dot series 23, representing the result of the test of the one second setting of the timer, contains 60 dots, or 60 ray pulsations showing the timer to be accurate at such setting. Similarly, the ⅜ second setting of the timer is shown to be accurate, there being twenty-two and a half dots in the series 24, of Figure 4. The half dot 24a is distinguishable from the others by reason of its relative faintness as indicated.

Although I have disclosed herein the now preferred form of the invention, it is to be understood that I do not limit myself thereto as my inventive concept is susceptible of various other mechanical expressions within the spirit and scope of the appended claims forming a part of this specification.

Having thus described my invention, what I claim is:

1. Means for testing the timer of an X-ray machine which emits a known number of X-ray pulsations comprising in combination with a piece of X-ray film, a plate-like X-ray impervious member mounted for movement in a predetermined path in opposed relation to the film and between the same and the rays discharged from the machine during timer-controlled operation intervals of same, and means selectively producing ray-pervious areas in said plate-like member at different points transversely of the path of travel of the same, whereby a plurality of series of markings can be produced upon the developed film.

2. Means for testing the timer of an X-ray machine which emits a known number of X-ray pulsations per second, said means comprising in combination with a piece of X-ray film, a plate-like X-ray-impervious member mounted for movement in a predetermined path in opposed relation to the film and between the same and the rays discharged from the machine during timer-controlled operation intervals of same, said plate-like member comprising superposed relatively adjustable plate sections having a plurality of selectively registrable apertures whereby to selectively provide ray-penetration openings through said member at different points transversely of the path of travel of the same whereby a plurality of series of X-ray pulsation-produced markings will appear on the developed film.

3. The combination set forth in claim 2, and means for maintaining said plate sections in adjusted position.

4. The combination set forth in claim 2, and selectively registerable indicating means associated with said plate members for denoting different relative settings of same.

5. The combination set forth in claim 2, and including selectively registerable indicating means associated with said plate members for denoting different relative settings of same, and means for maintaining said plate sections in adjusted position.

6. Means for testing the timer of an X-ray machine which emits a known number of X-ray pulsations per second, said means comprising in combination with a piece of X-ray film, a plate-like X-ray-impervious member mounted for spinning movement in opposed relation to a minor area of the film and between the same and the rays discharged from the machine during timer-controlled operation intervals of same, said plate-like member comprising superposed relatively adjustable plate sections having a plurality of selectively registerable apertures whereby to selectively provide ray-penetration openings through said member at different points transversely of the path of travel of the same whereby a plurality of series of X-ray-pulsation-produced markings will appear on the developed film.

7. The combination set forth in claim 6, and including a base adapted to be supported upon the film, a plate-member supporting pintle rising from said base, the lower one of said plate sections providing a medial upstanding post providing a pintle receiving bearing in which said pintle engages, and the other plate section having a medial hole through which said post extends to a height substantially above the plane of the upper surface of said second mentioned or top plate section whereby to provide a finger grip for spinning said plate member assembly.

8. The combination set forth in claim 6 and including a base adapted to be supported upon the film, a plate-member supporting pintle rising from said base, the lower one of said plate sections providing a medial upstanding post providing a pintle receiving bearing in which said pintle engages, the other plate section having a medial hole through which said post extends to a height substantially above the plane of the upper surface of said second mentioned or top plate section whereby to provide a finger grip for spinning said plate member assembly, and means for maintaining said plate sections in adjusted positions.

9. The combination set forth in claim 6 and including a base adapted to be supported upon the film, a plate-member supporting pintle rising from said base, the lower one of said plate sections providing a medial upstanding post providing a pintle receiving bearing in which said pintle engages, the other plate section having a medial hole through which said post extends to a height substantially above the plane of the upper surface of said second mentioned or top plate section whereby to provide a finger grip for spinning said plate member assembly, and selectively registerable indicating means associated with said plate members for denoting different relative settings of same.

10. The combination set forth in claim 6 and including a base adapted to be supported upon the film, a plate-member supporting pintle rising from said base, the lower one of said plate sections providing a medial upstanding post providing a pintle receiving bearing in which said pintle engages, the other plate section having a medial hole through which said post extends to a height substantially above the plane of the upper surface of said second mentioned or top plate section whereby to provide a finger grip for spinning said plate member assembly, and including selectively registerable indicating means associated with said plate members for denoting different relative settings of same, and means for maintaining said plate sections in adjusted position.

11. The combination set forth in claim 6 and including a base adapted to be supported upon the film, a plate-member supporting pintle rising from said base, the lower one of said plate sections providing a medial upstanding post providing a pintle receiving bearing in which said pintle engages, the other plate section having a medial hole through which said post extends to a height substantially above the plane of the upper surface of said second mentioned or top plate section whereby to provide a finger grip for spinning said plate member assembly, and including selectively registerable indicating means associated with said plate members for denoting different relative settings of same, and means for maintaining said plate sections in adjusted position, and said adjusted position maintaining means comprising a pin engageable in registering slots in said plate sections, and a flexible securing connection for said pin fastened to the upper end of said post.

WALTER L. GERKE.